United States Patent [19]

Suggs, Sr.

[11] Patent Number: 5,367,732
[45] Date of Patent: Nov. 29, 1994

[54] TIRE HANDLING TOOL
[75] Inventor: Donald R. Suggs, Sr., Boyd, Tex.
[73] Assignee: Tire Shuttle, Inc., Elm Mott, Tex.
[21] Appl. No.: 986,287
[22] Filed: Dec. 7, 1992
[51] Int. Cl.5 .............................................. B25F 1/00
[52] U.S. Cl. .................................... 7/100; 7/138; 81/177.6; 254/131
[58] Field of Search .......................... 7/100, 138, 166; 81/177.6, 177.5; 254/131

[56] References Cited

U.S. PATENT DOCUMENTS

| | | | |
|---|---|---|---|
| 1,957,126 | 5/1934 | Appel | 254/131 |
| 2,195,635 | 4/1940 | Smischny | 254/131 |
| 2,212,716 | 8/1940 | Noble et al. | 254/131 |
| 2,465,152 | 3/1949 | Ellison | 81/177.6 X |
| 2,504,345 | 4/1950 | Nellis . | |
| 2,569,242 | 9/1951 | Kors | 254/131 |
| 2,579,853 | 12/1951 | Pardee | 254/131 |
| 2,619,320 | 11/1952 | Miller | 254/131 |
| 2,639,121 | 5/1953 | Hudspeth | 254/131 |
| 2,701,707 | 2/1955 | Miller | 254/131 |
| 2,738,694 | 3/1956 | Boatright | 81/177.6 X |
| 2,808,162 | 10/1957 | Hellyer | 214/332 |
| 3,348,294 | 10/1967 | Gerardi | 29/273 |
| 3,615,073 | 10/1971 | Lickey | 254/131 |
| 3,649,976 | 3/1972 | Isom . | |

FOREIGN PATENT DOCUMENTS 870507  3/1953  Germany ........................... 254/131
1053333 3/1959  Germany .

Primary Examiner—James G. Smith
Attorney, Agent, or Firm—Guy V. Manning

[57] ABSTRACT

A tire handling tool for manipulating a wheel-mounted tire while installing or removing it from a vehicle comprises a single steel bar bent to form a forked, substantially planar, elongated body having a longitudinal axis bifurcated at a waist, a handle section adjacent the waist, the handle section formed by two parallel segments of the steel bar spaced apart by a plate at the waist and terminating in a transverse grip opposite the plate, the tool having a tine section adjacent the waist and extending coplanar with and opposite the handle section, the tine section formed by two divergent extensions of the steel bar segments forming the handle section, each tine having a traction means on one side for engaging a tread of a tire. The plate may have a driver stud for attaching a socket wrench extension perpendicular to the plate for tightening and loosening lug nuts. The plate may further include a spin handle opposite the driver stud to facilitate spinning the nuts onto and off of the lugs.

7 Claims, 3 Drawing Sheets

TIRE HANDLING TOOL

BACKGROUND OF THE INVENTION

1. Field of the Invention

This invention relates to improvements in tools designed to manipulate wheel-mounted tires while installing and removing them from a vehicle. It also relates to tools provided for spinning lug nuts onto and off of lugs.

2. Description of Related Art

Vehicles having pneumatic wheel-mounted tires provide lugs, usually concentric an axle hub, which cooperate with lug holes in the wheel for removably attaching the wheel to the vehicle. A single operator may be called upon to change a flat tire on a vehicle by swapping it for an inflated spare carried for such emergencies, but the task can prove too difficult for some operators without assistance. It usually requires lifting the wheel and tire into position and supporting their combined weight while stooping to align the lug holes with the lugs. On many vehicles, the lugs are recessed within a wheel well surrounded by the vehicle body such that lifting the tire must be performed in an awkward position, a formidable task for many and threatening to cause back strain even if the driver is accustomed to the task. Even wheel-mounted tires for personal vehicles can weigh scores of pounds, and, for relatively frail or incapacitated drivers alone, in the dark or during inclement weather, the task may prove daunting if not impossible. A need therefore exists for a tool to facilitate lifting and aligning spare tires.

Lug nuts often prove problematic during installation and removal. Lugs become dirty and corroded, increasing friction and making hand turning of the nuts unusually difficult. Further, tightening the nuts sufficiently for safe operation of the vehicle, and loosening them for removal of the tire, invariably requires the assistance of a wrench. An asymmetric combination tool, having on one end a socket adapted to fit the lug nuts, often is included with the spare tire of a given vehicle, but this standard tool at best proves itself tedious to use for turning the nuts onto and off of the lugs. As a lifting lever, the standard tire tool is usually too short and has but one "leg" with which to reach under the tire tread and pry upward. An "X", or cross-shaped tool, commonly known as a lug wrench, works better for quickly removing lug nuts because it has a lug socket on each end of two legs affixed perpendicular to each other at their midpoints. One end of one of the legs provides a built in handle for supporting the lug wrench while spinning the nuts on the lugs using the socket on the other end of that leg, while the transverse legs provide handy torquing lever arms. A lug wrench does not serve well, however, as a tire lifting and manipulating tool. Particularly when installing the wheel, two legs greatly facilitate supporting the tire and deter unwanted rolling while aligning lug holes with lugs. Used in this fashion, however, a lug wrench provides no central handle for manipulating the tool and tire. A need therefore exists for a single tool that can serve not only as a lug nut spinning and tightening tool, but also as a tire lifting and manipulating tool when not being used to adjust lug nuts.

In commercial frame and axle repair shops, large wheel-mounted truck or tractor tires weighing several hundred pounds must be manipulated during installation and removal. Merely erecting such a tire from its position lying flat on the floor to standing upright on its tread can require a lever tool or the assistance of another person. A forked tool providing two point support to the tire significantly improves upon the controllability of a single lever for this task. Mechanics often also overcome with shear muscle power the awkwardness of installing tires within a recessed wheel well of a large truck. This is particularly awkward when installing or removing the inside wheel of a tandem wheel hub, the center of gravity of the wheel requiring manipulation of its weight even deeper under the vehicle and beyond the support point of the hub. A need therefore exists for a means for lifting and manipulating very large truck and tractor wheel-mounted tires during installation and removal.

Of several devices available for lifting and handling tires, none combine these features with lug nut torquing or spinning conveniences. Smischny, U.S. Pat. No. 2,195,635, provides a tool having a short pair of prongs flaring slightly and extending into a different plane from one end of a generally U-shaped handle. For numerous reasons, however, this device serves poorly for lifting any but the lightest weight tires. For example, the handle is too wide relative to the prongs. For maximum control in lifting heavy tires, an operator must stand alongside the tool and reach to his side to grasp the handle in its center. The further the operator must reach to the side, the further off balance the weight of the tire becomes during lifting, increasing the consequent back strain and risk of injury. Further, the short prongs require lifting the handle end through a great range of motion relative to the small amount of accomplished lift of the tire edge.

Several combination tools offer lifting and lug nut torquing features together in one tool, but none provide well any lug nut spinning capabilities like a lug wrench. Isom, U.S. Pat. No. 3,649,976, and Nellis, U.S. Pat. No. 2,504,345, both provide rectangular, fork-shaped lifting tools with sockets on the end of the handle opposite the fork. Relying on these sockets for spinning lug nuts is at best awkward, however, because the user must reach around the fork to grasp the handle. Miller, U.S. Pat. Nos. 2,701,707 and 2,619,320, provides two "hairpin" shaped tools having transverse arms bearing lug nut sockets, but the asymmetric hairpin shaped lever arms provide poor torquing leverage.

SUMMARY OF THE INVENTION

Accordingly, it is an object of this invention to provide an improved tool for lifting and manipulating wheel-mounted tires during installation and removal.

It is another object of this invention to provide a combination tire manipulating tool convenient for removing and installing lug nuts.

It is yet another object of this invention to provide a tool for assisting a single operator in lifting a heavy tire from the floor to stand onto its tread as well as for manipulating a wheel-mounted tire while installing and removing it on a vehicle.

The foregoing and other objects of this invention are achieved by providing a tire handling tool for manipulating a wheel-mounted tire while installing or removing it from a vehicle, the tool comprising a single steel bar bent to form a forked, substantially planar, elongated body having a longitudinal axis bifurcated at a waist, a handle section adjacent the waist, the handle section formed by two parallel segments of the steel bar spaced apart by a plate at the waist and terminating in a transverse grip opposite the plate, the tool further having a fork section adjacent the waist and extending coplanar with and opposite the handle section, the fork section formed by two divergent extensions of the steel bar segments forming the handle section, each tine of the fork having a provision for traction on one side for engaging a tire tread. The plate may have a driver stud for attaching a socket wrench extension perpendicular to the plate for tightening and loosening lug nuts. The plate may further include a spin handle opposite the driver stud to facilitate spinning the nuts onto and off of the lugs.

BRIEF DESCRIPTION OF THE DRAWINGS

The novel features believed characteristic of the present invention are set forth in the appended claims. The invention itself, however, as well as a preferred mode of use and further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figures 1, 2:
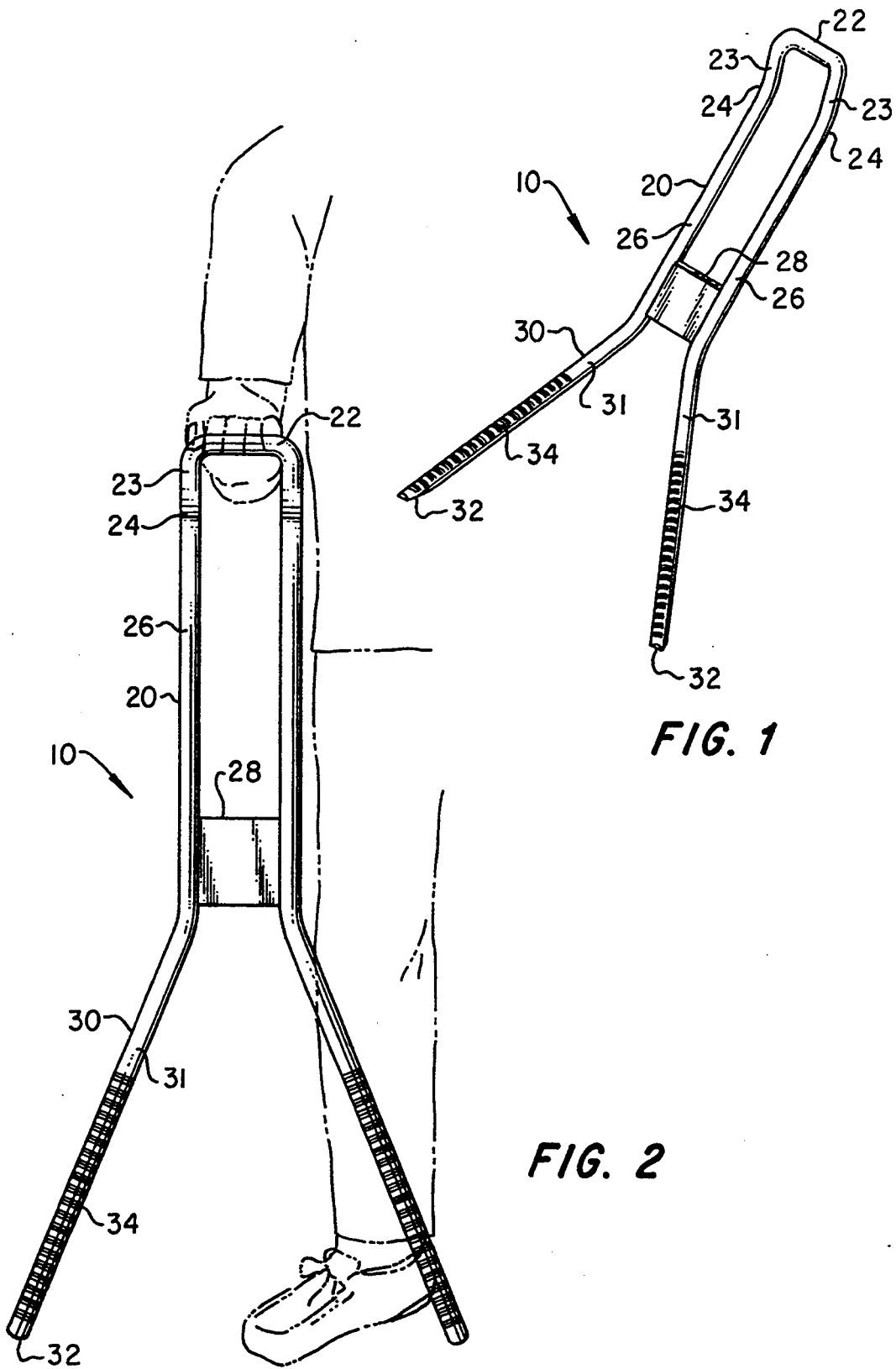
FIG. 1 depicts in perspective a preferred embodiment of the of the present invention.
FIG. 2 shows a front elevational view of the tool of FIG. 1 as positioned by an operator for use.

With reference now to the figures, and in particular to FIGS. 1 and 2, tire handling tool 10 of the preferred embodiment is shown in top right perspective and front elevational views respectively. Tool 10 comprises handle section 20 and fork section 30 extending symmetric along a longitudinal axis. As illustrated in FIG. 2, a user grasps grip 22 and manipulates tool 10 while standing behind fork section 30 and closely alongside handle section 20.

Handle section 20 comprises an elongated, U-shaped body made up of two parallel arms 26 spaced apart at one end by plate 28 and at the opposite end by grip 22 extending transverse handle 20 between arms 26. A spaced distance from grip 22 toward plate 28, elbows 24 at one end of each arm 20 define fingers 23, each finger 23 connecting one end of grip 22 to corresponding arm 26. The angles formed by elbows 24 cause fingers 23 to be substantially parallel and to define a plane containing fingers 23 and grip 22, which plane is non-coplanar with handle 20 but which intersects it at elbows 24. When tool 10 lies flat on its backside upon a floor or other surface, the resulting vertical offset of grip 22 permits easy insertion of a hand under grip 22 for lifting tool 10. The offset also protects the hand from being injured if a heavy tire is lowered or inadvertently dropped to the floor while loaded onto the front side of tool 10.

Figure 3:
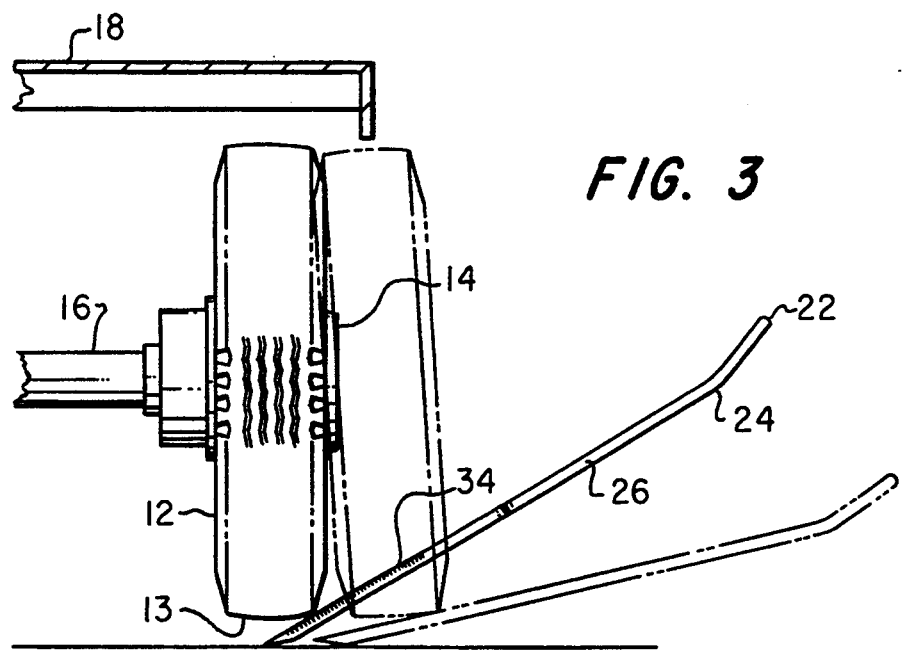
FIGS. 3 illustrates use of the tool to lift a wheel mounted tire into place or to remove it from a vehicle.

Extending coplanar with body 20, fork section 30 comprises two legs 31, or tines, diverging from their junction with handle body 20 adjacent plate 28. Each leg 31 adjoins an arm 26 adjacent plate 28 and terminates opposite plate 28 in foot 32. As seen in FIG. 3, foot 32 comprises a sharply beveled region on the back side of leg 31, which beveled foot 32 facilitates insertion of leg 31 beneath a tire tread 13 and serves as a slidable bearing surface and as a fulcrum for prying upward by lifting grip 22. On the front sides of legs 31 are traction means 34 provided to create a friction contact between legs 31 and tread 13 to assist in positive manipulation of tire 12 with tool 10.

Figure 6A:
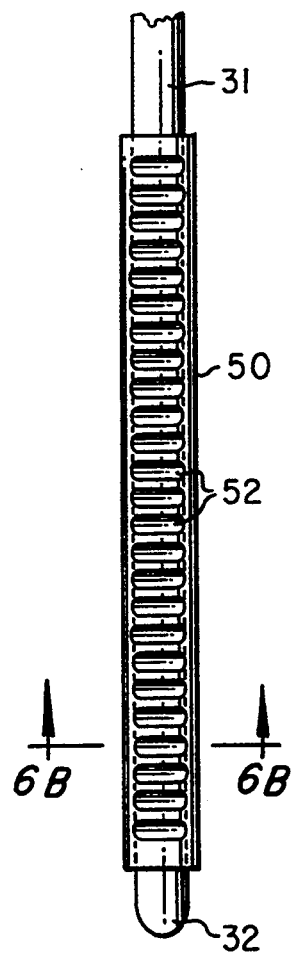
FIGS. 6A and 6B detail in front elevational view and cross section thereof a portion of one leg of the tool of FIGS. 1 and 2 showing an alternate method of providing traction between the tool and the tire.
Figure 6B:
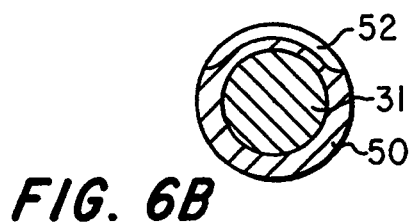

As seen in FIGS. 6A and 6B, an alternate method of providing traction includes sheath 50 surrounding a substantial length of each leg 31. Sheath 50 has transverse grooves 52 cut into it which create the traction interface with tread 13. Sheath 50 is preferably a neoprene hose or other suitable hard rubber or plastic tubing, having an inside diameter closely matched to the outside diameter of leg 31, and having characteristics of durability and resistance to hydrocarbon products. Sheath 50 offers the advantage of being replaceable once worn or if a different traction pattern is desired. It also can be removed to eliminate altogether the traction pattern on legs 31.

Figures 5A, 5B, 5C:
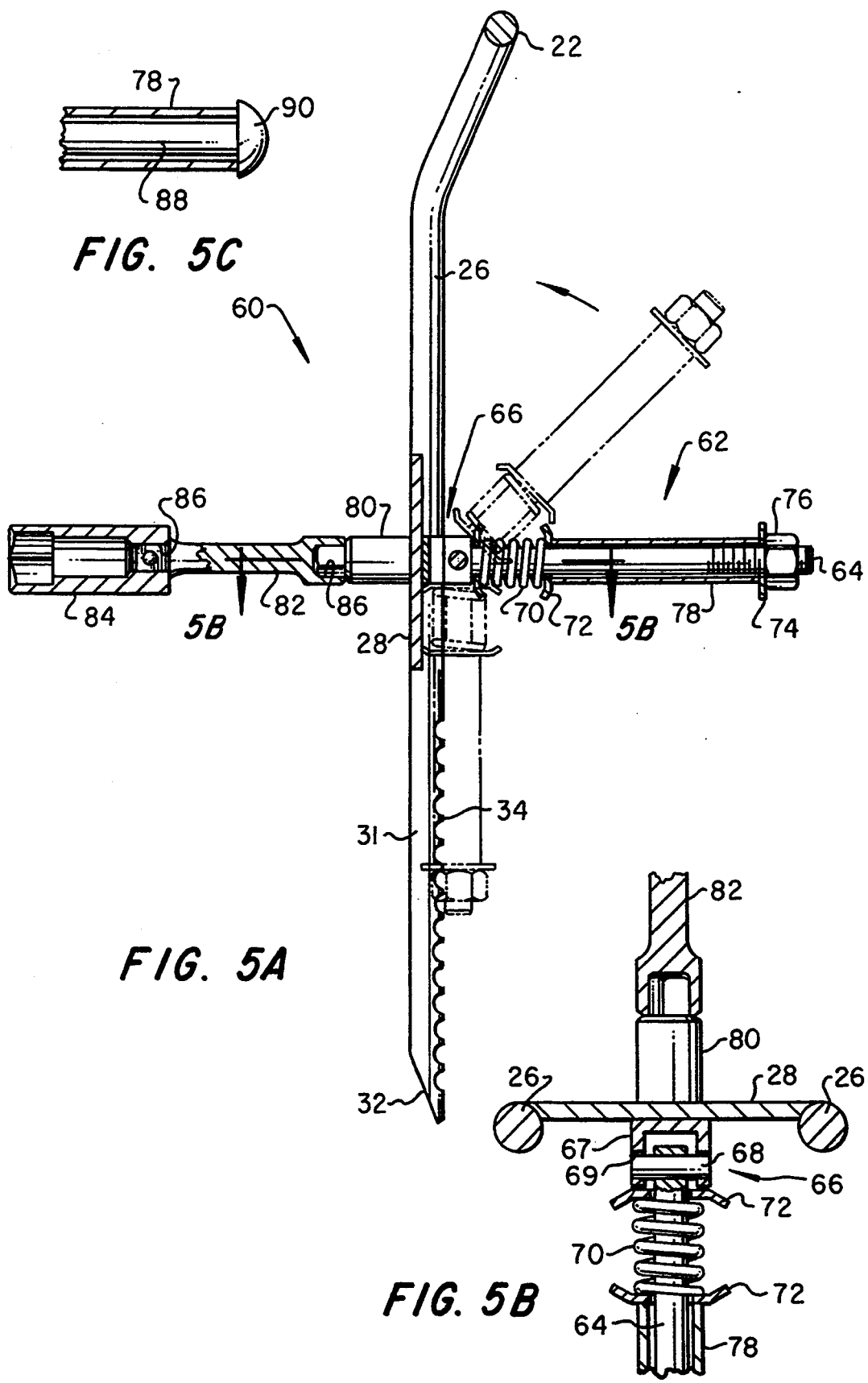
FIGS. 5A and 5B show in partial side and top section views an alternate embodiment of the tool having a socket wrench driver stud and spin handle.
FIG. 5C details an alternate bolt head for the spin handle of FIG. 5A.

FIGS. 5A and 5B illustrate another embodiment 60 of tool 10 wherein plate 28 includes a socket wrench driver stud 80 adapted to cooperate with female driver socket 86 of socket wrench extension 82 or directly with socket 84. By providing socket 84 adapted to fit lug nuts for a given vehicle, tool 60 becomes a wrench for tightening and loosening lug nuts. Grip 22 and legs 31 provide lever arms for applying torque to lug nuts as well as for quickly turning them onto the lugs before tightening or off the lugs after breaking them loose for removal. A clip (not shown) may be provided to secure extension 82 and socket 84 to plate 28 for storage.

FIGS. 5A and 5B also detail spin handle 62 provided to facilitate spinning lug nuts onto and off of lugs in cooperation with the socket wrench assembly just discussed. Spin handle 62 comprises bolt 64 pivotally attached to plate 28 by attachment means 66. Attachment means 66 comprises C-channel 67 attached to plate 28 and having legs extending on either side of bolt 64. Pin 68 cooperates with transverse bores 69 through the legs of C-channel 67 and a like bore 63 through bolt 64 to pivotally secure bolt 64 to plate 28.

Coaxial with and surrounding a substantial portion of bolt 64 is tubular hilt 78 adapted to be grasped and held by an operator while bolt 64 spins freely within hilt 78. Retaining and tensioning nut 76 holds hilt 78 between washer 74 at one end of bolt 64 and biasing spring 70 adjacent C-channel 67. In FIG. 5C, and alternate bolt 88 having a rounded head 90 may replace nut 76 and washer 74 to simplify the design and appearance should tension adjustment of spring 72 using nut 76 be unnecessary.

Flanked by washers 72, spring 70 bears upon the legs of C-channel 67 to confine spin handle 62 into one of three positions lying within a plane substantially perpendicular to the plane of plate 28 and handle 20 and containing the longitudinal axis of tool 10. When spin handle 62 is moved from one position to another, spring 70 compresses to permit it to pass across corner 71 of C-channel 67 and expands when spin handle 62 reaches the new position. Corners 71 of C-channel 67 and spring 70 thereby create a detented positioning means for spring handle 62. The three positions shown or implied by FIG. 5A include: (A) coaxial with driver 80 for using tool 60 as wrench, (B) folded between legs 31 for storage, and (C) folded between arms 26 opposite position (B) (implied by FIG. 5A wherein progress toward such position is depicted) for using tool 60 as a tire lifting and handling device. For these positions, the legs of C-channel 67 would be rectangular as shown in FIG. 5A, but one having ordinary skill in the art will recognize that any number of positions can be achieved, should others be desirable, by altering the shape of C-channel 67.

In operation, tool 10 may be used to install or remove a wheel-mounted tire. For removal, the user first breaks loose all lug nuts by engaging them one at a time with socket 84 and applying torque using handle 20 and legs 31 of fork 30. Once loose, lug nuts may by backed off the lugs by hand, by grasping handle 20 and legs 31 and turning tool 60, or by grasping hilt 78 in one hand and applying spinning torque to handle 20 or one leg 31 to spin tool 10 while supporting it with spin handle 62. Once the lug nuts are removed, the user removes and stores socket extension 82 and folds spin handle 62 out of the way between arms 26. The user then grasps tool 10 by grip 22 and inserts each foot 32 of legs 31 beneath tread 13 of tire 12 as shown in FIG. 3. Lifting upward on grip 22 takes the weight of tire 12 off the lugs. Grasping the top of tire 12 and tilting it away from axle 12 easily disengages lug holes 17 from the lugs while continuing to support the weight of tire 12. If tire 12 is deep within a wheel well recess of vehicle 18, tool 10 may be used to easily "walk" the tire outward by horizontally translating grip 22 alternately left and right while dragging the opposite foot 32 successively farther away from axle 16 until tire 12 is out from under vehicle 18. Tool 10 may then be lowered to lie flat upon the floor without pinching the user's hand between grip 22 and the floor. Once laid down, tool 10 may be released, freeing another hand to assist handling tire 12.

Installation of tire 12 onto axle 16 is achieved substantially by reversing the foregoing removal steps, with variations discussed in the following paragraphs. If tire 12 is resting flat upon the floor (not shown), feet 32 of tool 10 may be inserted beneath one sidewall adjacent tread 13 and astraddle a radius of tire 12. Because handle 20 is only a small fraction in width of the separation of feet 32, the user can step alongside handle 20 to place his foot near the apparent center of gravity of tool 10 to be loaded with the weight of tire 12, as illustrated in FIG. 2. The user can then lift tire 12 by virtually standing over handle 20 and lifting grip 22 straight upward. Lifting grip 22 in this fashion provides mechanical leverage easily to lift and hold the side of tire 12 above the floor almost the full length of legs 31, whereupon a prop may be placed under tire 12 to maintain such lifting progress while tool 10 is reset deeper beneath tire 12 for a second lifting effort.

In such fashion, a very heavy tire 12 may be ratcheted into a vertical standing position with its weight resting upon its tread 13. Tire 12 is then rolled to the vicinity of vacant axle 16 within a wheel well of vehicle 18. Tool 10 may be inserted easily beneath tread 13 and lifted by grip 22 until traction 34 engages tread 13, lifting tire 12. The user places his other hand onto tire 12 to steady it in the dimension parallel to axle 16 and the longitudinal axis of tool 10. Because tire 12 is supported at two points on tread 13 astraddle the center of gravity of tire 12, the user need not also steady tire 12 in the dimension perpendicular to axle 16 and transverse the longitudinal axis of tool 10, a dimension in which tire 12 could roll were it not supported at two points by fork 30 fo tool 10.

As illustrated in FIG. 3, tire 12 may then be "walked" forward into the wheel well toward axle 16 by slightly tilting the top of tire 12 toward axle 16 and then horizontally translating grip 22 slightly to withdraw the support of one leg 31 from beneath tread 13. This causes differential lifting between legs 31 and permits tire 12 to roll in a direction substantially perpendicular to and away from the unwithdrawn leg 31 and toward vehicle 18. Tool 10 is reset beneath tread 13 with the opposite leg 31 causing differential lifting to roll tire 12 in the other direction but continuing toward axle 16. These steps are repeated until tire 12 is in position to be lifted onto the lugs of axle 16.

Figure 4:
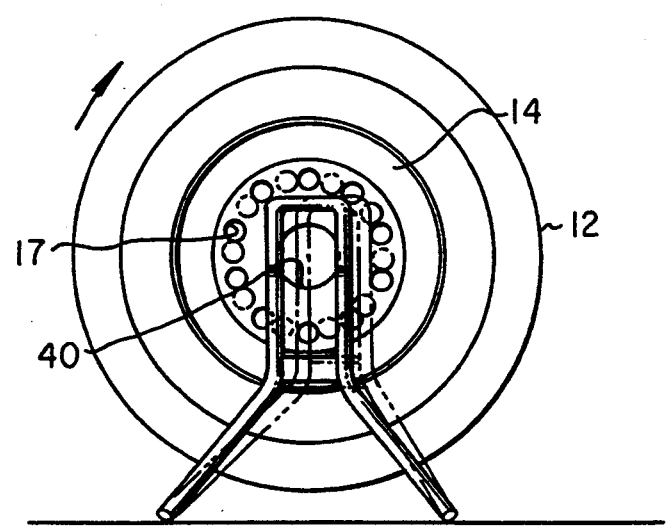
FIG. 4 illustrates use of the tool to spin the tire for alignment of lug holes with lugs.

Tool 10 then is reset beneath tread 13 to achieve balanced rather that differential lifting, and grip 22 is lifted to simultaneously raise and tilt tire 12 to rest against axle 16 until hub port 40 mates with the hub of axle 16. The weight of tire 12 is then supported by the hub and not by tool 10. In the unlikely event that the lugs align with lug holes 17, tool 10 may be lifted slightly to encourage tire 12 to shift toward the lugs until lug holes 17 mate with the lugs, settling tire 12 into place to await tightening of the lug nuts against it. More likely, lugs and lug holes 17 do not align, however. Tool 10 may be reset to differentially lift tread 13 on one side or the other of the vertical centerline of tire 12 to cause it to rotate, as seen in FIG. 4, until lugs and lug holes 17 align and tire 12 may be settled into place. Lug nuts are then threaded onto the lugs and spun into position and tightened by reversing the removal steps discussed above.

Tool 10 is preferably fabricated from a single length of steel bar bent cold at selected locations along its length to achieve the geometric arrangement described above. One having ordinary skill in the art will recognize not only that the components discussed as separate are in fact part of a continuous steel bar but that they could be separate pieces joined at appropriate places by welding or by other suitable means. The preferred material for a tool 10 for a frame and axle shop is eleven sixteenths (11/16") inch rod grade B-7 (cold drawn SAE 4142 heat treated and stress relieved, substantially equivalent to bolt specification grade 8) or better steel bar which provides necessary resiliency for resistance to bending under load expected in that environment. Though highly resistant to bending, this grade of steel is soft enough to bend double rather than snap under excess loads, providing a desirable safety feature. Alternately, forged tool steel rated at similar specifications satisfies these criteria. One having ordinary skill in the art will recognize, however, that the diameter and strength selected depend upon the expected loads. For example, the steel bar required for satisfactory lifting of personal automobile tires is smaller in diameter than that needed for lifting much heavier tractor tires, and tool 10 can be made of the smaller bar and retain satisfactory resiliency and resistance to bending. Further, one having ordinary skill in the art will recognize that all grades of steel meeting such criteria, as well as others less desirable and even other materials such as rigid aluminum and high strength thermoplastics may serve the purpose under certain loading conditions and are considered within the spirit and scope of the present invention.

Through usage and testing, it has been shown that a user can learn through practice to manipulate tire 12 into place and settle it onto the lugs ready for lug nuts much more quickly and easily that when using alternate means available. Further, by providing an effective extension of the apparent lever arm for lifting tire 12 lying flat on the floor, tool 10 permits an experienced user to lift very heavy wheel-mounted tires without assistance and, often, with only one hand. Finally, providing a spin handle and socket extension assembly effectively substitutes one tool for two to be carried with the spare tire of personal vehicles, reducing weight and space requirements while increasing ease of changing a flat tire.

While the invention has been particularly shown and described with reference to one or more preferred embodiments, it will be understood by those skilled in the art that various changes in form and detail may be made therein without departing from the spirit and scope of the invention. For example, dimensional size of one embodiment is implied by the phantom image of a user's leg and hand in FIG. 2. Other sizes, however, can be employed for smaller and larger tires 12, including, but not limited to a smaller version for automobile and recreational vehicle wheels, and a larger version for tractor tires.

I claim:

1. A tire handling tool having a longitudinal axis and comprising
    two arms parallel the axis and defining a planar, elongated body section;
    a transverse handle connecting the arms at one end of the body section, the handle being non-coplanar with the body;
    a transverse plate separating and connecting the arms opposite the handle;
    a fork section adjacent the plate and having two divergent legs extending opposite the body section; and
    a driver stud affixed to the plate and extending perpendicular to the plane of the body.

2. The tire handling tool of claim 1 wherein
    the driver stud is adapted to cooperate with a removable socket to convert the tire tool to a lug nut wrench.

3. A tire handling tool made from a single steel bar bent to form a forked, substantially planar, elongated body having a longitudinal axis bifurcated at a waist, the body further comprising
    a plate located at the waist and having a width transverse the longitudinal axis;
    a handle section formed by two parallel segments of the steel bar on opposite sides of and adjacent the plate and connected at an end opposite the plate by a transverse segment of the bar forming a grip;
    a tine section extending from the waist opposite the handle section and being defined by two divergent legs formed from opposite ends of the steel bar; and
    a driver stud affixed to the plate and extending perpendicular to the plane of the body.

4. The tire handling tool according to claim 3 wherein the tool further comprises
    a spin handle coaxial with the driver stud and extending from the plate opposite the driver stud.

5. The tire handling tool according to claim 4 wherein the spin handle comprises
    a central bolt extending from the plate coaxial with and opposite the driver stud and terminating in a retainer nut;
    attachment means for attaching the bolt to the plate; and
    a tubular hilt extending coaxial with the bolt between the nut and the attachment means, the hilt adapted to spin freely in relation to the bolt.

6. The tire handling tool according to claim 5 wherein the attachment means comprises
    pivot means attached to the plate and cooperating with the bolt for pivoting the handle from one position to another within a plane oriented perpendicular to the plane of the tool and containing the longitudinal axis; and
    detent means adapted to confine the spin handle in one at a time of a plurality of positions radial from the pivot means.

7. The tire handling tool according to claim 6 wherein the detent means comprises
    a C-channel attached to the plate with matching, substantially rectangular channel legs extending away from the plate on either side of the bolt and parallel to the perpendicular plane of the spin handle, the channel legs including aligned transverse holes cooperating with a pin extending through the bolt to serve as the pivot means; and
    a spring coaxial with the bolt between and bearing upon the C-channel and the tubular hilt for biasing the hilt against the retaining nut, the spring adapted to be compressed as it passes a corner of the channel legs while the spin handle pivots about the pin from a position perpendicular to the plate to a position parallel to the longitudinal axis.

* * * * *